United States Patent
Lee et al.

(10) Patent No.: US 12,160,323 B2
(45) Date of Patent: Dec. 3, 2024

(54) GROUPCAST TRANSMISSION METHOD AND APPARATUS THEREFOR

(71) Applicant: ELECTRONICS AND TELECOMMUNICATIONS RESEARCH INSTITUTE, Daejeon (KR)

(72) Inventors: Jung Hoon Lee, Daejeon (KR); Ju Ho Park, Daejeon (KR); Jun Hwan Lee, Seoul (KR); Il Gyu Kim, Chungcheongbuk-do (KR); Jun Hyeong Kim, Daejeon (KR); Go San Noh, Daejeon (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 730 days.

(21) Appl. No.: 17/276,390

(22) PCT Filed: Sep. 11, 2019

(86) PCT No.: PCT/KR2019/011804
§ 371 (c)(1),
(2) Date: Mar. 15, 2021

(87) PCT Pub. No.: WO2020/060105
PCT Pub. Date: Mar. 26, 2020

(65) Prior Publication Data
US 2022/0078040 A1   Mar. 10, 2022

(30) Foreign Application Priority Data

Sep. 21, 2018 (KR) .................. 10-2018-0114133
Nov. 21, 2018 (KR) .................. 10-2018-0144838
(Continued)

(51) Int. Cl.
*H04W 92/18* (2009.01)
*H04L 1/1607* (2023.01)
(Continued)

(52) U.S. Cl.
CPC ........ *H04L 12/1868* (2013.01); *H04L 1/1621* (2013.01); *H04L 5/0055* (2013.01); *H04L 12/185* (2013.01)

(58) Field of Classification Search
None
See application file for complete search history.

(56) References Cited

U.S. PATENT DOCUMENTS 8,107,426 B2   1/2012  Cho et al.
8,861,418 B2  10/2014  Wu et al.
(Continued)

FOREIGN PATENT DOCUMENTS

JP   2018-082491 A    5/2018
KR   10-1095420 B1   12/2011

OTHER PUBLICATIONS

Oppo, "Discussion of sidelink unicast, groupcast and broadcast for NR-V2X", 3GPP TSG RAN WG1 Meeting #94, R1-1808875, Gothenburg, Sweden, Aug. 20-24, 2018.
(Continued)

*Primary Examiner* — Gary Lafontant
(74) *Attorney, Agent, or Firm* — LRK PATENT LAW FIRM

(57) ABSTRACT

A method for performing sidelink groupcast transmission by a transmission terminal includes the steps of: classifying reception terminals belonging to a subject group into two or more subgroups; allocating different groupcast feedback schemes to the two or more subgroups; performing groupcast transmission to the reception terminals; and receiving feedback information from terminals belonging to at least
(Continued)

one subgroup among the two or more subgroups according to the different groupcast feedback schemes.

4 Claims, 9 Drawing Sheets

(30) Foreign Application Priority Data

| | | |
|---|---|---|
| Jan. 7, 2019 | (KR) | 10-2019-0001640 |
| Jan. 11, 2019 | (KR) | 10-2019-0003922 |
| Apr. 25, 2019 | (KR) | 10-2019-0048476 |
| May 14, 2019 | (KR) | 10-2019-0056523 |
| Jun. 25, 2019 | (KR) | 10-2019-0075585 |
| Sep. 9, 2019 | (KR) | 10-2019-0111212 |

(51) Int. Cl.
*H04L 5/00* (2006.01)
*H04L 12/18* (2006.01)
*H04W 72/04* (2023.01)

(56) References Cited

U.S. PATENT DOCUMENTS

| | | |
|---|---|---|
| 8,937,894 B2 | 1/2015 | Kim et al. |
| 8,971,947 B2 | 3/2015 | Kwon et al. |
| 10,764,011 B2 | 9/2020 | Qu et al. |
| 10,932,227 B2 | 2/2021 | Wang et al. |
| 2013/0235784 A1 | 9/2013 | Kim et al. |
| 2014/0029584 A1 | 1/2014 | Qu et al. |
| 2015/0358888 A1 | 12/2015 | Gulati et al. |
| 2016/0174200 A1 | 6/2016 | Seok et al. |
| 2017/0347394 A1* | 11/2017 | Yasukawa ............ H04W 28/04 |

OTHER PUBLICATIONS

Samsung, "Discussion on support of unicast, groupcast and broadcast for NR V2X", 3GPP TSG RAN WG1 #94, R1-1808775, Gothenburg, Sweden, Aug. 20-24, 2018.
Search Report, mailed Feb. 25, 2020, for International Application No. PCT/KR2019/011804.
Written Opinion, mailed Feb. 25, 2020, for International Application No. PCT/KR2019/011804.

* cited by examiner

GROUPCAST TRANSMISSION METHOD AND APPARATUS THEREFOR

CROSS-REFERENCE TO RELATED APPLICATIONS

The present application is a U.S. National Phase entry from International Application No. PCT/KR2019/011804, filed Sep. 11, 2019, which claims priority to Korean Patent Application Nos. 10-2018-0114133, filed Sep. 21, 2018, 10-2018-0144838, Nov. 21, 2018, 10-2019-0001640, filed Jan. 7, 2019, 10-2019-0003922, filed Jan. 11, 2019, 10-2019-0048476, filed Apr. 25, 2019, 10-2019-0056523, filed May 14, 2019, 10-2019-0075585, filed Jun. 25, 2019, and 10-2019-0111212, filed Sep. 9, 2019, the disclosure of which is incorporated by reference herein in their entirety.

TECHNICAL FIELD

The present invention relates to methods for groupcast transmission in a wireless communication system, and more particularly, to methods for allocating sidelink groupcast feedback resources, methods for transmitting groupcast feedback, and apparatuses for the same.

BACKGROUND ART

In the 3rd generation partnership project (3GPP), a new radio (NR) standardization phase 1 has been completed in Release-15, and a standardization phase 2 has been started in Release-16, so that new features of the NR system are being discussed. One of the representative functions under discussion is NR vehicular-to-everything (V2X) communication. The V2X is a technology that supports communications in various scenarios such as between vehicles, between a vehicle and an infrastructure, and between a vehicle and a pedestrian based on device-to-device (D2D) communications of the long term evolution (LTE) system, and is also continuing to develop. The NR V2X is also being discussed in the NR with the start of Release 16.

Three types of data transmission schemes are being discussed in the NR V2X. They are a unicast scheme for transmitting data to a specific terminal, a broadcast scheme for transmitting the same data to all terminals, and a groupcast scheme for transmitting data to a group consisting of a plurality of terminals. In the case of unicast data transmission, a specific terminal receives data transmitted to itself, and transmits acknowledgement (ACK) or negative acknowledgment (NACK) feedback according to whether the data has been normally received or not. When confirming that the ACK is transmitted as a result of identifying the ACK/NACK feedback, a transmitting terminal may determine that the specific terminal has successfully received the data. On the other hand, when it is confirmed that the NACK is transmitted, the transmitting terminal may determine that the specific terminal has failed to receive the data, and may transmit additional information according to a HARQ scheme or retransmit the same data to increase the probability of receiving the data at the specific terminal. In the case of broadcast scheme of transmitting the same data to all terminals, since it is difficult to receive ACK/NACK feedbacks from all the terminals, and it is difficult to determine whether the data has been normally received at each of all the terminals, the ACK/NACK feedback procedure is not usually applied. In case of system information, which is representative information transmitted in the broadcast scheme, the ACK/NCAK feedback procedure is not applied. Therefore, the system information is periodically broadcast to solve the problem that it cannot be determined whether the data has been normally received at each of all the terminals. In the case of the groupcast scheme newly discussed in the NR V2X, since information is transmitted to a plurality of terminals, it is possible to periodically transmit necessary information without the ACK/NACK feedback procedure as in the broadcast scheme. However, unlike the broadcast scheme, when the number of target receiving terminals are limited and the type of data is a type of data that should be received within a predetermined time, efficient and stable data transmission and reception can be enabled by applying the ACK/NACK feedback procedure similarly to the unicast scheme.

In addition, in case of power control for groupcast, a transmission power of the transmitting terminal may be appropriately adjusted according to a transmission environment, thereby increasing data reliability at the receiving terminal, and mitigating interferences to other terminals. It also increases energy efficiency by reducing unnecessary transmission power usage. In the case of power control, there are an open-loop power control scheme, in which the transmission power is set with a value determined by a transmitting side in consideration of a given configuration and a measured environment, and a closed-loop power control scheme, in which the transmitting side adjusts a previously set power value by receiving a transmit power control (TPC) command from a receiving side of data.

DISCLOSURE

Technical Problem

The present invention is directed to providing an operation method of a transmitting terminal for groupcast transmission.

The present invention is also directed to providing an operation method of a receiving terminal for groupcast reception.

Technical Solution

A method for sidelink groupcast transmission performed in a transmitting terminal, according to a first exemplary embodiment of the present invention for achieving the above-described objective, may comprise classifying receiving terminals belonging to a target group into two or more subgroups; assigning different groupcast feedback schemes to the two or more subgroups; performing groupcast transmission to the receiving terminals; and receiving feedback information from terminals belonging to at least one subgroup among the two or more subgroups using the different groupcast feedback schemes.

The receiving terminals may be classified into the two or more subgroups based on a distance between the transmitting terminal and each of the receiving terminals or a strength of a received signal from the transmitting terminal and each of the receiving terminals.

The different groupcast feedback schemes may include a scheme of assigning individual acknowledgement/negative acknowledgement (ACK/NACK) resources to terminals belonging to a target subgroup, a scheme of assigning a common NACK resource to terminals belonging to a target subgroup, and a scheme of not performing feedback.

The individual ACK/NACK resources or the common NACK resource may be explicitly configured by the transmitting terminal to each of the receiving terminals or to all of the receiving terminals through a control channel scheduling the groupcast transmission.

The individual ACK/NACK resources or the common NACK resource may be implicitly determined by each of the receiving terminals using at least one of a specific index of control channel elements (CCEs) constituting a control channel scheduling the groupcast transmission, an index of a specific resource block (RB) of a data channel used for the groupcast transmission, a specific index of a sub channel which is a basic resource unit of the data channel used for the groupcast transmission, a slot index of the data channel used for the groupcast transmission, a group identifier assigned to the group, and an identifier of the each of the receiving terminals.

The scheme of assigning the individual ACK/NACK resources may be assigned to a subgroup consisting of terminals located relatively far from the transmitting terminal or terminals having a relatively small received signal strength from the transmitting terminal, and the scheme of assigning the common NACK resource or the scheme of not performing feedback may be assigned to a subgroup consisting of terminals located relatively close to the transmitting terminal or terminals having a relatively large received signal strength from the transmitting terminal.

Different common NACK feedback resources may be configured to subgroups to which the scheme of assigning the common NACK resource is configured.

Each terminal belonging to the subgroups to which the scheme of assigning the common NACK resource is assigned may transmit feedback information of the each terminal by multiplying the feedback information of the each terminal with a complex conjugate of a reception channel of the each terminal or a complex conjugate of a phase of the reception channel of the each terminal.

The method may further comprise, when a time point of performing the groupcast transmission is preconfigured, receiving a discontinuous transmission (DTX) or NACK feedback from a terminal not detecting a control channel scheduling the groupcast transmission at the preconfigured time point, wherein the transmitting terminal transmits dummy control information when the transmitting terminal does not have data to transmit at the preconfigured time point.

The method may further comprise, when a time point of performing the groupcast transmission is not preconfigured, receiving a DTX feedback for a control channel scheduling the groupcast transmission from a receiving terminal after a connection between the transmitting terminal and the receiving terminal is established.

The feedback information may be received in a physical sidelink feedback channel (PSFCH) for receiving the feedback information as multiplexed with feedback information of a different unicast or a different groupcast.

A method for sidelink groupcast transmission performed in a transmitting terminal, according to a second embodiment of the present invention for achieving the above-described objective, may comprise receiving reception power related parameters from receiving terminals belonging to a target group; determining an initial power in consideration of the received reception power related parameters; performing groupcast transmission using the determined initial power as a transmission power; and increasing the transmission power or switching a transmission beam for performing the groupcast transmission based on negative acknowledgement (NACK) feedback information from the receiving terminals.

Each of the reception power related parameters may be a reference signal received power (RSRP) measured based on a reference signal or a synchronization signal block which is received from the transmitting terminal or a base station, or a path loss between the transmitting terminal and each of the receiving terminals.

The initial power may be set to an N-th minimum value of the received reception power related parameters, N may be a natural number equal to or greater than 1, and N may be differently set according to a service type of the groupcast transmission.

In the determining of the initial power, power related parameters for uplink communication between the transmitting terminal and a base station may be further considered in addition to the received reception power related parameters.

When the increased transmission power exceeds a maximum transmission power of the transmitting terminal, the transmission power may be set to the maximum transmission power of the transmitting terminal.

A method for sidelink groupcast reception performed in a receiving terminal, according to a third embodiment of the present invention for achieving the above-described objective, may comprise identifying a subgroup to which the receiving terminal belongs; identifying a groupcast feedback scheme assigned to the identified subgroup; receiving a groupcast transmission from a transmitting terminal; and transmitting or not transmitting feedback information to the transmitting terminal through the identified groupcast feedback scheme.

The groupcast feedback scheme may be determined based on a distance between the transmitting terminal and the receiving terminal or a strength of a received signal from the transmitting terminal and the receiving terminal.

The groupcast feedback scheme may be a scheme of assigning individual acknowledgement/negative acknowledgement (ACK/NACK) resources to the receiving terminal, a scheme of assigning a common NACK resource of the identified subgroup to the receiving terminal, or a scheme of not performing feedback.

The scheme of assigning the individual ACK/NACK resources may be assigned to the receiving terminal when the receiving terminal is located relatively far from the transmitting terminal or the receiving terminal has a relatively small received signal strength from the transmitting terminal, and the scheme of assigning the common NACK resource or the scheme of not performing feedback may be assigned to the receiving terminal when the receiving terminal is located relatively close to the transmitting terminal or the receiving terminal has a relatively large received signal strength from the transmitting terminal.

Advantageous Effects

Using the groupcast HARQ feedback methods of the exemplary embodiments according to the present disclosure, it is made possible to determine whether data reception at each of all terminals belonging to a group is successful. Also, when only some of the terminals in the group have not received the data normally, the transmitting terminal can proceed to transmit and receive groupcast data for the entire group as it is, and may separately perform retransmission of the corresponding data in the unicast scheme only for some of the terminals that have not received the data normally. Therefore, the efficiency of data transmission can be improved.

MODES OF THE INVENTION

Figure 1:
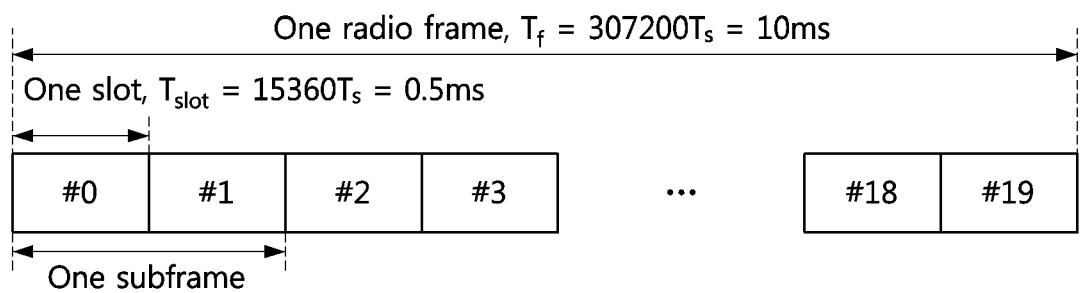
FIG. 1 is a conceptual diagram illustrating a type 1 frame structure in the LTE system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

The 3GPP Long Term Evolution (LTE) system, which is one of the conventional mobile communication technologies, supports three types of frame structures. The first is a type 1 frame structure applicable to Frequency Division Duplex (FDD), the second is a type 2 frame structure applicable to Time Division Duplex (TDD), and the last is a type 3 frame structure for transmission in an unlicensed frequency band.

FIG. 1 is a conceptual diagram illustrating a type 1 frame structure in the LTE system.

Referring to FIG. 1, one radio frame may have a length of 10 ms (307,200 $T_S$), and comprise 10 subframes. Here, $T_S$ is a sampling time and has a value of $1/(15\text{ kHz} \times 2048)$. Each subframe has a length of 1 ms, and one subframe includes two slots each having a length of 0.5 ms. One slot consists of seven OFDM symbols in case of a normal CP and six OFDM symbols in case of an extended CP.

Figure 2:
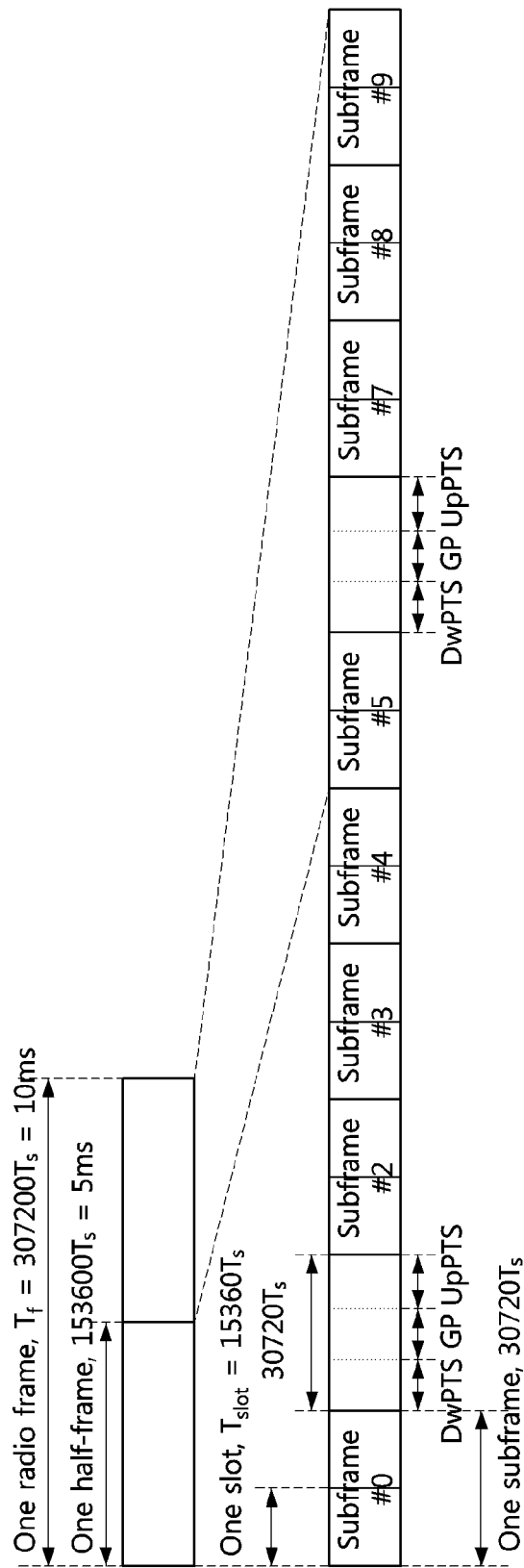
FIG. 2 is a conceptual diagram illustrating a type 2 frame structure in the LTE system.

FIG. 2 is a conceptual diagram illustrating a type 2 frame structure in the LTE system.

Referring to FIG. 2, the relationship among a radio frame, subframes, and slots, and their lengths are the same as in the case of type 1. As a difference, one radio frame may be composed of downlink subframe(s), uplink subframe(s), and special subframe(s). The special subframe(s) may exist between a downlink subframe and an uplink subframe, and may include a Downlink Pilot Time Slot (DwPTS), a Guard Period (GP), and an Uplink Pilot Time Slot (UpPTS). One radio frame may include two special subframes when a downlink-uplink switching periodicity is 5 ms, and one special subframe when the downlink-uplink switching periodicity is 10 ms. The DwPTS may be used for cell search, synchronization, or channel estimation, and the GP may be a period for removing interference generated in uplink of a base station due to a multipath delay difference of terminals.

In the UpPTS, a Physical Random Access Channel (PRACH) or a Sounding Reference Signal (SRS) may be transmitted.

In the LTE system, a Transmission Time Interval (TTI) means a basic time unit in which an encoded data packet is transmitted through a physical layer signal. The LTE release 14 defines short TTI-based data transmission to meet low latency requirements. To distinguish the TTI up to release 14 from the short TTI, the TTI up to release 14 may be referred to as a 'base TTI' or 'regular TTI'.

The base TTI of the LTE system consists of one subframe. That is, a time axis length of a Physical Resource Block (PRB) pair, which is a minimum unit of resource allocation, is 1 ms. In order to support transmission of the 1 ms TTI, physical signals and channels are also mostly defined on a subframe basis. For example, a Cell-specific Reference Signal (CRS), a Physical Downlink Control Channel (PDCCH), a Physical Downlink Shared Channel (PDSCH), a Physical Uplink Control Channel (PUCCH) and a Physical Uplink Shared Channel (PUSCH) may exist for each subframe. On the other hand, a Primary Synchronization Signal (PSS) and a Secondary Synchronization Signal (SSS) may be present in every fifth subframe, and a Physical Broadcast Channel (PBCH) may be present in every tenth subframe. Meanwhile, one radio frame consists of 10 subframes and has a time axis length of 10 ms. The radio frame is identified by a System Frame Number (SFN), which is used to define transmission of a signal (e.g., paging, channel estimation reference signal, channel state information reporting) having a transmission periodicity longer than one radio frame. A periodicity of the SFN is 1024.

In the LTE system, the PBCH is a physical layer broadcast channel that conveys the most essential system information called a Master Information Block (MIB). The PBCH is transmitted every tenth subframe and is transmitted once in one radio frame. The MIB should be transmitted with the same information during four radio frames, after which it may change depending on the situation of the system. This is called a PBCH TTI (=40 ms) for convenience. In this case, the transmitted MIB includes 3 bits indicating a system band, 3 bits related to a Physical Hybrid ARQ Indicator Channel (PHICH), 8 bits for the SFN, 10 bits reserved for future use, and 16 bits for a cyclic redundancy check (CRC). That is, the MIB is comprised of a total of 40 bits. The SFN identifying the radio frame consists of a total of 10 bits (B9~B0), and only 8 bits (B9~B2) that are most significant bits (MSB) of the SFN are transmitted through the PBCH. Accordingly, the information on the corresponding SFN, which is transmitted through the PBCH, is not changed during four radio frames. The remaining 2 bits (B1~B0) that are lest significant bits (LSB) of the SFN changing during four radio frames are implied through a scrambling sequence used for the PBCH without being explicitly given by the MIB transmitted through the PBCH. As the scrambling sequence of the PBCH, a gold sequence generated by being initialized with a cell identifier (ID) is used, and the PBCH scrambling sequence is newly initialized by an equation of mod (SFN, 4) with a periodicity of four radio frames. Therefore, a gold sequence, which is newly generated by being initialized with a cell ID for each radio frame whose LSB 2-bits of the SFN is '00', is applied as the scrambling sequence. Gold sequences, which are generated successively thereafter, are used for PBCH scrambling in radio frames whose 2 bits of the SFN ends with '01', '10', and '11'. Accordingly, the terminal acquiring a cell ID during an initial cell search may implicitly identify information on '00', '01', '10', or '11' of the LSB 2 bits of the SFN through the scrambling sequence during the PBCH decoding. The terminal may finally identify 10 bits (B9~B0) of the SFN by combining two bits (B1~B0) obtained through the scrambling sequence and 8 bits (B9~B2) obtained explicitly through the PBCH.

The evolved mobile networks after the LTE should meet technical requirements to support a wider range of service scenarios, as well as the high transmission speeds that were previously a major concern. Recently, the ITU-R has defined key performance indicators (KPIs) and requirements for the IMT-2020, the official name for 5G mobile communications. These are summarized as enhanced mobile broadBand (eMBB), ultra reliable low latency communication (URLLC), and massive machine type communication (mMTC). The planned schedule of the ITU-R aims to distribute frequencies for the IMT-2020 in year 2019 and complete international standard approval by year 2020.

The 3GPP is developing 5G standard specifications based on a new radio access technology (RAT) that meets the requirements of IMT-2020. According to the definition of 3GPP, the new radio access technology is a radio access technology that does not have backward compatibility with the existing 3GPP radio access technology. The new wireless communication system after the LTE adopting such the radio access technology will be referred to herein as a new radio (NR).

One of the features that the NR differs from CDMA or LTE, which is the conventional 3GPP system, is that it utilizes a wide range of frequency bands to increase transmission capacity. In this regard, the WRC-15, which is organized by the ITU, defined an agenda of the next WRC-19, which will review 24.25 to 86 GHz band as a candidate frequency band for the IMT-2020. The 3GPP considers the sub-1 GHz band to the 100 GHz band as candidate bands for the NR.

As waveform technologies for the NR, candidates such as orthogonal frequency division multiplexing (OFDM), filtered OFDM, generalized frequency division multiplexing (GFDM), filter bank multi-carrier (FBMC), and universal filtered multi-carrier (UFMC) are being discussed. Although there are advantages and disadvantages, cyclic prefix (CP) based OFDM and single carrier-frequency division multiple access (SC-FDMA) are still effective schemes for 5G systems due to the relatively low implementation complexity and multiple-input multiple-output (MIMO) scalability. However, in order to flexibly support various 5G usage scenarios, a method of simultaneously accommodating various waveform parameters in one carrier without guard bands may be considered. To this end, the filtered OFDM, the GFDM, or the like having a frequency spectrum with low out of band emission (OOB) may be suitable.

In the present invention, for convenience of description, it is assumed that the CP-based OFDM (CP-OFDM) is a waveform technology for wireless access. However, this is merely for convenience of description, and the scope of the claims of the present invention is not limited to a specific waveform technology. In general, the category of CP-based OFDM technology includes the filtered OFDM or the spread spectrum OFDM (e.g., DFT-spread OFDM) technology.

One of the biggest factors determining a subcarrier spacing of an OFDM system is a carrier frequency offset (CFO) experienced by a receiver, which is characterized by an increase in proportion to an operating frequency due to a Doppler effect and a phase drift. Therefore, in order to prevent performance degradation due to the carrier frequency offset, the subcarrier spacing should increase in proportion to the operating frequency. On the other hand, if the subcarrier spacing is too large, there is a disadvantage that the CP overhead increases. Therefore, the subcarrier spacing should be defined as an appropriate value considering channel and RF characteristics for each frequency band.

Various numerologies are considered in the NR system. For example, the subcarrier spacing of 15 kHz, which is the subcarrier spacing of the conventional LTE, and the subcarrier spacings of 30 kHz, 60 kHz, and 120 kHz, which respectively are 2, 4, and 8 times scaled, may be considered together. Configuring the differences between the subcarrier spacings of different numerologies by exponential multipliers of 2 may be advantageous for heterogeneous numerology-based carrier aggregation, frame structure design, and multiplexing of heterogeneous numerology within one carrier.

The NR system is expected to be used in a wide range of frequencies ranging from hundreds of MHz to tens of GHz. In general, since the diffraction and reflection characteristics of radio waves are not good at high frequencies, propagation characteristics are generally not good, and propagation losses such as path loss and reflection loss are known to be relatively large compared to those of the low frequencies. Therefore, when the NR system is deployed in the high frequency, cell coverage may be reduced as compared with the existing low frequency. In order to solve this problem, a method of increasing cell coverage through beamforming using a plurality of antenna elements may be considered at high frequency.

The beamforming schemes may include an analog beamforming scheme and a digital beamforming scheme. The digital beamforming scheme may obtain a beamforming gain by using a plurality of radio frequency (RF) paths based on multiple input multiple output (MIMO) and a digital precoder or a codebook. The analog beamforming scheme may obtain a beamforming gain through an antenna array and a number of analog and RF devices such as phase shifters, power amplifiers (PAS), and variable gain amplifiers (VGAs). Since the digital beamforming scheme requires a digital-to-analog converter (DAC) or an analog-to-digital converter (ADC) and requires the same number of transceiver units (TXRUs) as antenna elements, increase of the beamforming gain proportionally increases the complexity of the antenna implementation as well. In the analog beamforming scheme, since a plurality of antenna elements are connected to a single transceiver unit through phase shifters, even when the number of antenna elements is increased in order to increase the beamforming gain, the resulting complexity is not greatly increased. However, the performance of the analog beamforming scheme is lower than that of the digital beamforming scheme, and the frequency resource utilization efficiency is limited because the phase shifters are controlled in time domain. Therefore, a hybrid beamforming scheme, which is a combination of the analog scheme and the digital scheme, may be used.

In the case that the cell coverage is increased through the beamforming, not only dedicated control channels and dedicated data for each terminal in the cell but also common control channels and common signals for all terminals in the cell may be also transmitted in the beamforming manner. When the common control channels and signals are transmitted to all terminals by applying the beamforming to increase the cell coverage, since the common control channels and signals cannot be transmitted to all the regions in the cell through a single transmission, they may be transmitted through a plurality of beams over a plurality of times for a predetermined time. Transmitting multiple times by switching multiple beams is called beam sweeping. Such the beam sweeping operation is necessarily required when transmitting common control channels and signals using the beamforming.

A terminal accessing the system acquires downlink frequency/time synchronization and a cell ID through a synchronization signal (SS), acquires uplink synchronization through a random access procedure, and establishes a link. In this case, in the NR system, TDM-based multiplexing of an NR-SS and an NR-PBCH which are periodically transmitted is supported, and they are transmitted using N(=4) OFDM symbols. These N OFDM symbols are defined as an SS block (SSB). In case of transmitting the SSBs using beamforming, a beam sweeping operation that transmits multiple beams while switching the multiple beams is required. For this, a plurality of SSBs may be defined within a transmission period of the NR-SS and the NR-PBCH, and the plurality of SSBs configured as described above are assembled into an SS burst set.

Figure 3:
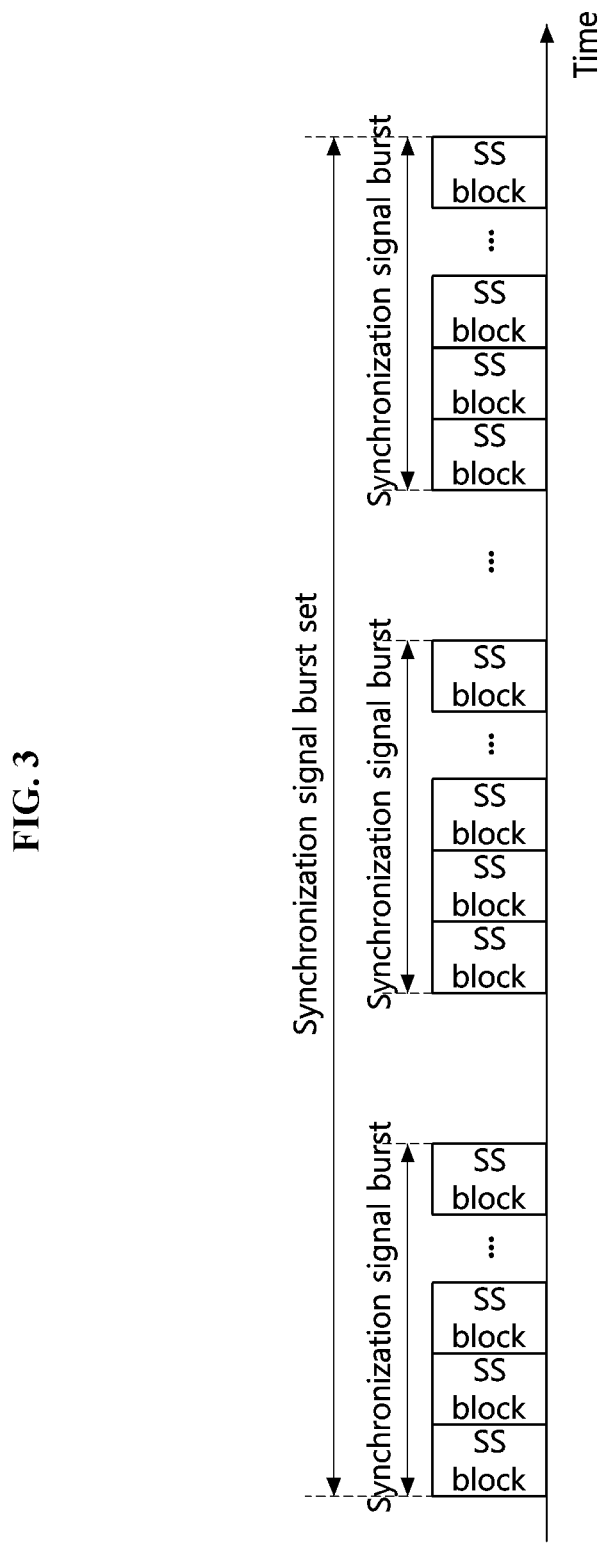
FIG. 3 is a conceptual diagram for describing transmission of an SS burst set in an NR system.

FIG. 3 is a conceptual diagram for describing transmission of an SS burst set in an NR system.

Referring to FIG. 3, an SS burst set is repeated periodically. According to a periodicity of the SS burst set, the base station transmits SSBs to the terminals in the cell through different beams in a beam sweeping manner. The maximum number L of SSBs constituting one SS burst set and the locations of the L SSBs are defined in the specification, and L may have a different value according to a system frequency region. The number and locations of SSBs actually transmitted among the L SSBs may be determined by a network.

Figure 4:
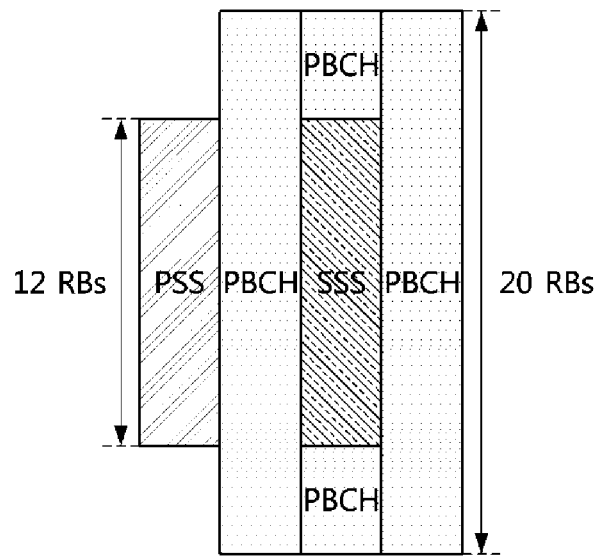
FIG. 4 is a conceptual diagram for describing a synchronization signal block configuration of an NR system.

FIG. 4 is a conceptual diagram for describing a synchronization signal block configuration of an NR system.

Referring to FIG. 4, signals and a channel are time division multiplexed in one SSB in the order of PSS, PBCH, SSS, and PBCH, and the PBCH may be transmitted in both end bands adjacent to the frequency band in which the SSS is transmitted. Also, an SSB index may be identified through a PBCH DMRS when the maximum number L of SSBs is 8 in the sub 6 GHz frequency band. When the maximum number L of SSBs is 64 in the over 6 GHz frequency band, LSB 3 bits of 6 bits representing the SSB index is identified through the PBCH DMRS, and the remaining MSB 3 bits are transmitted through a payload of the PBCH, which are identified by performing decoding on the PBCH.

The NR system can support a system bandwidth of up to 400 MHZ, but in case of a terminal, the size of bandwidth that can be supported may vary according to the capability of the terminal. Therefore, some terminals accessing the wideband system can access only part of the entire band of the system. In order to facilitate connection of terminals supporting various bandwidths in a system supporting such a wide bandwidth, unlike the conventional LTE, which always transmits synchronization signals and PBCHs at the center of the system bandwidth, the NR system may transmit SSBs in multiple locations in the frequency axis.

Figure 5:
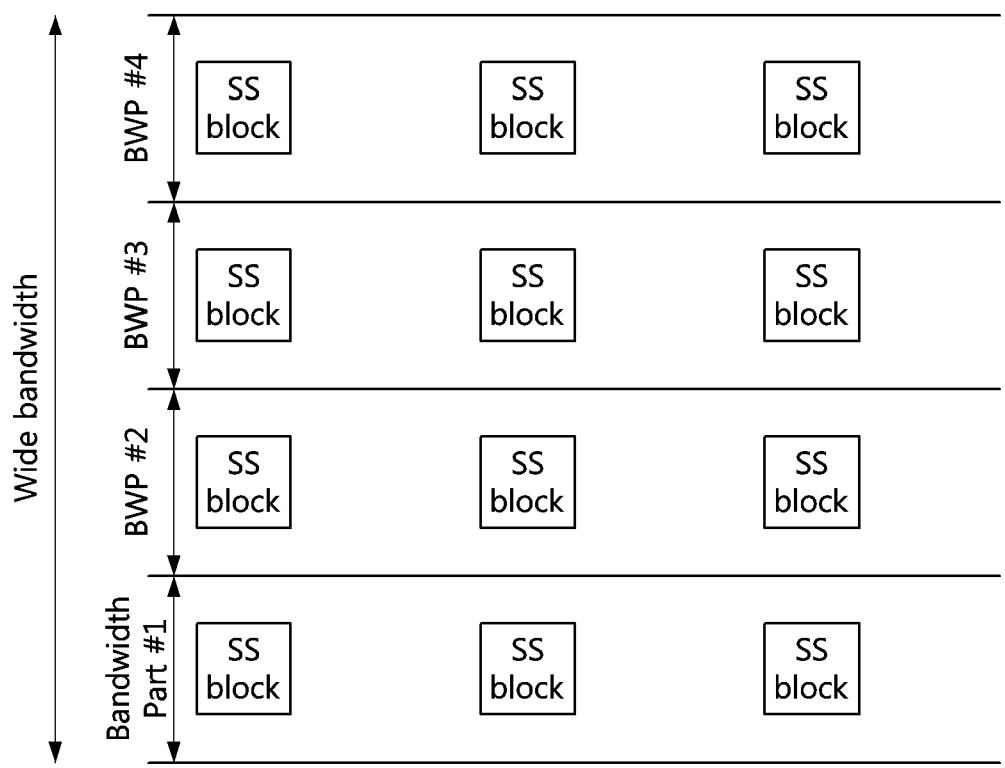
FIG. 5 is a conceptual diagram for describing an example of dividing a wideband component carrier (CC) into a plurality of bandwidth parts (BWP) and transmitting SSBs in each BWP in an NR system.

FIG. 5 is a conceptual diagram for describing an example of dividing a wideband component carrier (CC) into a plurality of bandwidth parts (BWP) and transmitting SSBs in each BWP in an NR system.

Referring to FIG. 5, a terminal may perform initial access using one of SSBs transmitted through each BWP. After detecting an SSB, the terminal may perform a cell access procedure by acquiring Remaining Minimum System Information (RMSI), and the RMSI may be transmitted in a PDSCH through scheduling by a PDCCH. In this case, configuration information of a Control Resource Set (CORESET) in which the PDCCH containing scheduling information of a RMSI PDSCH is transmitted is transmitted through a PBCH in the SSB. When multiple SSBs are transmitted in the entire system band, some SSBs may have RMSIs associated therewith, and some SSBs may not have RMSIs associated therewith. In this case, the SSB having the associated RMSI is defined as a 'cell defining SSB', and the cell search and initial access procedure of the terminal may be performed only through the 'cell defining SSB'. The SSBs not having the associated RMSI may be used for performing synchronization or measurement in the corresponding BWP. In this case, the BWP in which the SSB is transmitted may be limited to some of several BWPs in the wideband.

As described above, the reception of RMSI is performed through a series of processes of detecting a PDCCH through the CORESET configuration information transmitted through a PBCH, obtaining scheduling information of an RMSI from the PDCCH, and receiving a PDSCH accordingly. In this case, a control channel resource region through which the PDCCH can be transmitted is configured through RMSI CORESET configuration information, which may have three patterns as follows.

Figure 6:
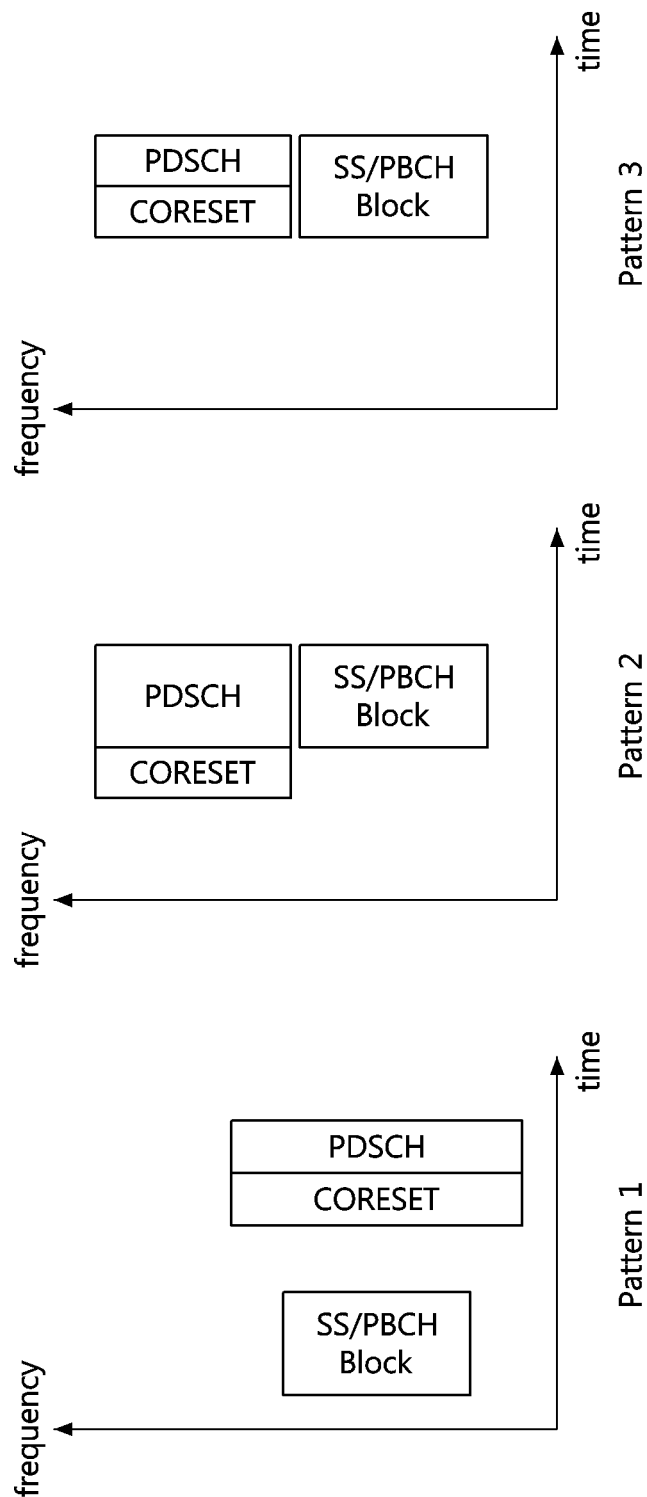
FIG. 6 is a conceptual diagram for describing three basic patterns for configuring an RMSI CORESET in an NR system.

FIG. 6 is a conceptual diagram for describing three basic patterns for configuring an RMSI CORESET in an NR system.

In order to configure an RMSI CORESET, one of three patterns shown in FIG. 6 is selected, and detailed configuration is completed in the selected pattern. In the pattern 1, SSB, RMSI CORESET, and RMSI PDSCH are all TDMed. In the pattern 2, RMSI CORESET and RMSI PDSCH are TDMed, and only RMSI PDSCH is frequency division multiplexed (FDMed) with SSB. In the pattern 3, RMSI CORESET and RMSI PDSCH are TDMed, and both RMSI CORESET and RMSI PDSCH are FDMed with SSB. Only the pattern 1 can be used in the frequency band below 6 GHz, and the patterns 1, 2, and 3 can be used in the frequency band above 6 GHz. Also, the numerologies used for SSB, RMSI CORESET, and RMSI PDSCH may differ. For the pattern 1, all combinations of numerologies can be used. For the pattern 2, only combinations of {SSB, RMSI}, which include {120 kHz, 60 kHz} and {240 kHz, 120 kHz}, can be used. For the pattern 3, only a combination of (SSB, RMSI), which is {120 kHz, 120 kHz}, can be used.

The RMSI CORESET configuration information selects one of the three patterns according to a combination of numerologies for SSB and RMSI. The RMSI CORESET configuration information may be configured using Table A representing the number of resource blocks (RBs) of the RMSI CORESET, the number of symbols of the CORESET, and information on an offset between an RB of the SSB and an RB of the RMSI CORESET, and Table B representing the number of search space sets per slot for each pattern and information for configuring a monitoring occasion of RMSI PDCCH such as a CORESET offset, an OFDM symbol index, and the like. Each of Tables A and B actually consists of several tables (Table A: Table 13-1 to Table 13-8, Table B: Table 13-9 to Table 13-13). The RMSI CORESET configuration information is configured with 4 bits from each of Tables A and B, and represents information of 8 bits.

Groupcast Feedback Scheme

In groupcast, unlike unicast, since there is one transmitting terminal and a plurality of receiving terminals, it is difficult to apply the unicast ACK/NACK transmission scheme as it is. Accordingly, exemplary embodiments of the present invention first propose schemes for receiving ACK/NACK feedback information from a plurality of terminals which are destinations of groupcast data when groupcast data transmission and reception are performed.

In an exemplary embodiment according to the present invention, an ACK/NACK feedback procedure of the groupcast may be performed in form of receiving ACK/NACK feedback information individually from all terminals belonging to a group, similarly to the unicast case. Since the groupcast scheme transmits data to a plurality of terminals, it may be possible to receive ACK/NACK feedback information on whether data is successfully received at each individual terminal belonging to the group. When receiving the ACK/NACK feedback information in this manner, different ACK/NACK resources should be allocated to the terminals in the group, and the transmitting terminal monitors the ACK/NACK resources of all the terminals in the group, and determines whether to perform retransmission according to a result of the monitoring. When applying the ACK/NACK feedback procedure in this manner, a number of ACK/NACK resources should be secured according to the number of terminals constituting the group. In addition, since the transmitting side should monitor all ACK/NACK signals fed back from the plurality of terminals constituting the group, it is not advantageous in terms of resource efficiency and complexity. However, it is possible to determine whether data reception is successful for each of the individual terminals in the group. Therefore, when only some of the terminals in the group do not receive data, groupcast data transmission and reception can proceed continuously for the entire group, and only for some terminals that do not receive the data properly, the transmitting terminal may retransmit the data separately in a unicast scheme. This is advantageous in terms of data transmission efficiency.

Figure 7:
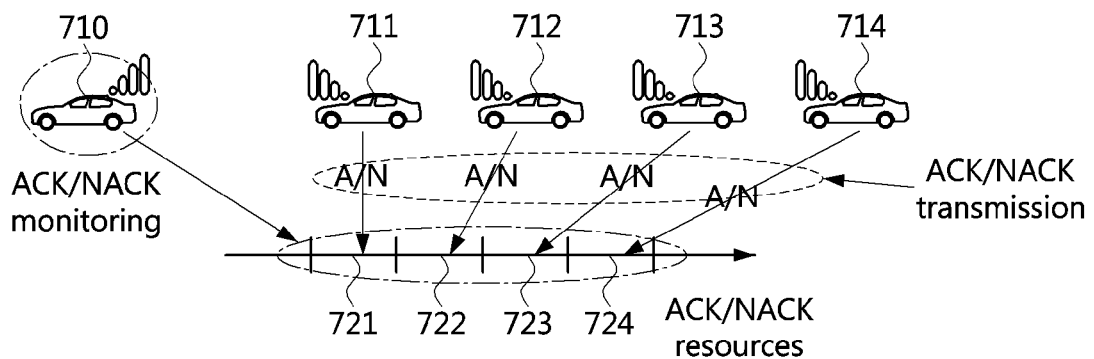
FIG. 7 is a conceptual diagram illustrating a case in which individual ACK/NACK resources are allocated to respective terminals in a group according to an exemplary embodiment of the present invention.

FIG. 7 is a conceptual diagram illustrating a case in which individual ACK/NACK resources are allocated to respective terminals in a group according to an exemplary embodiment of the present invention.

Referring to FIG. 7, each of a terminal 711, a terminal 712, a terminal 713, and a terminal 714 may transmit its feedback information with respect to data transmitted by a groupcast transmitting terminal 710 through a resource 721, 722, 723, or 724 allocated to each of them. In this case, resources for the respective terminals 721 to 724 may be allocated by the groupcast transmitting terminal 710 and informed by the transmitting terminal 710 to each receiving terminal, or may be allocated by a base station (not shown) and informed by the base station to each receiving terminal. Alternatively, in an implicit manner, each receiving terminal may determine a resource allocated to it. This will be described later.

By individually assigning ACK/NACK resources to the respective terminals, each of the receiving terminals in the group may transmit feedback information in the ACK/NACK resource allocated thereto according to whether data reception is successful or not. Meanwhile, the groupcast transmitting terminal 710 may monitor all the ACK/NACK resources 721 to 724 and determine whether data retransmission is necessary based on the monitoring. Meanwhile, although the ACK/NACK resources are illustrated as resources orthogonal in the time axis in FIG. 7, the ACK/NACK resources may be different sequences, different cyclic shifts of the same sequence, or different resources orthogonal in the frequency axis. In addition, the ACK/NACK resources may be allocated in any form that can distinguish ACK/NACK signals transmitted by each terminal.

Hereinafter, the feedback scheme described in FIG. 7 may be referred to as an 'individual ACK/NACK feedback scheme'.

As described above, the scheme of individually receiving the ACK/NACK feedback information from all terminals in the group (i.e., the exemplary embodiment of FIG. 7) may not be advantageous in terms of efficiency and complexity of ACK/NACK resources. Therefore, in another exemplary embodiment according to the present invention, only one ACK/NACK resource may be allocated to the entire group. That is, only one ACK/NACK resource is allocated to the entire ACK/NACK group, and all the terminals in the group may perform ACK/NACK feedback through the ACK/NACK resource common to the terminals belonging to the group according to whether the data is normally received. In this case, when all the terminals in the group transmit the same ACK/NACK signals, the receiving side of the ACK/NACK signals may have an effect that the signals are received as combined, so that the ACK/NACK signal detection performance at the receiving side can be improved. However, in case that propagation times of the ACK/NACK signals are different because the positions of the terminals in the group are different, the ACK/NACK signals from the individual terminals may be received differently. In order to solve this problem, when the ACK/NACK resources are allocated in form of Zadoff-Chu sequences, the ACK/NACK resources for groupcast may have a larger cyclic shift interval of Zadoff-Chu sequence than those of the ACK/NACK resources for unicast. In other words, even when the same ACK/NACK resources are transmitted from a plurality of terminals in the group, it can be prevented from being confused as other ACK/NACK resources according to the propagation delay time.

Meanwhile, when the feedback information is transmitted by allocating the same ACK/NACK resource on behalf of the group, the ACK/NACK information may be different between terminals in the group. For example, some terminals may transmit ACK, but some other terminals may transmit NACK. In this case, as a scheme of distinguishing between ACK and NACK in the same ACK/NACK resource, a scheme of transmitting +1 in case of ACK and −1 in case of NACK may be applied. However, in the case of transmission using this scheme, since an ACK value transmitted by some terminals and a NACK value transmitted by some other terminals may be simultaneously transmitted in the same ACK/NACK resource, it may be difficult for the receiving side of the ACK/NACK signal to determine ACK or NACK.

Therefore, in an exemplary embodiment according to the present invention, an ACK resource and a NACK resource representing a group may be separately allocated for the groupcast ACK/NACK feedback. For example, in the case of the ACK/NACK resource of the Zadoff-Chu sequence type, different cyclic shifts may be allocated as the ACK resource and the NACK resource. Alternatively, the ACK resource and the NACK resource may be different resources orthogonal in the frequency axis. When the ACK resource and the NACK resource representing the group are allocated as described above, terminals that correctly receive data in the group may transmit feedback through the ACK resource, and terminals that do not correctly receive the data may transmit feedback through the NACK resource. The receiving side of the ACK/NACK signal may monitor the ACK resource and the NACK resource separately, and then determine ACK or NACK. In this scheme, since the terminals transmitting NACK cannot be distinguished, retransmission for only some terminals not receiving data cannot be performed. Therefore, when a feedback signal is detected in the NACK resource, the groupcast transmitting terminal may perform groupcast retransmission for the entire group. In this case, the groupcast transmitting terminal may signal to the receiving terminals whether normal transmission or retransmission of previous data is performed using a retransmission indicator in a channel (e.g., PDCCH or PSCCH) including control information for retransmission. In this case, compared to the case of determining ACK or NACK through the same ACK/NACK resource, twice as much resources are needed, and complexity may be increased because the receiving side of the ACK/NACK signal needs to separately monitor different resources for ACK and NACK. However, it is more advantageous in terms of resource efficiency and complexity than the allocation of ACK/NACK resources for the respective terminals in the groupcast group.

Figure 8:
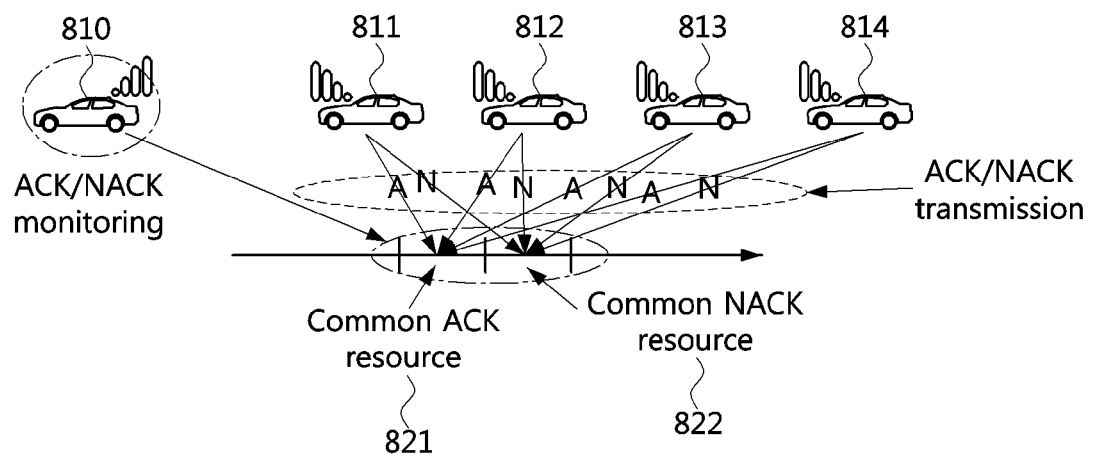
FIG. 8 is a conceptual diagram illustrating a case in which a common ACK resource and a common NACK resource are separately allocated to terminals in a group according to an exemplary embodiment of the present invention.

FIG. 8 is a conceptual diagram illustrating a case in which a common ACK resource and a common NACK resource are separately allocated to terminals in a group according to an exemplary embodiment of the present invention.

Referring to FIG. 8, a groupcast transmitting terminal 810 or a base station may separately allocate a common ACK resource 821 and a common NACK resource 822 for a group composed of terminals 811 to 814. Each terminal in the group may transmit the respective ACK/NACK feedback information using the common ACK resource 821 or the common NACK resource 822 according to whether data is normally received. The groupcast transmitting terminal 810 may monitor the common ACK resource 821 and the common NACK resource 822 separately, and retransmit groupcast data when a signal is detected in the common NACK resource 822. In this case, the groupcast transmitting terminal 810 may signal to the receiving terminals whether normal transmission or retransmission of previous data is performed using a retransmission indicator in a channel (e.g., PDCCH or PSCCH) including control information for the retransmission.

Meanwhile, as described above, the common ACK resource and the common NACK resource for the group may be separately allocated and the ACK/NACK feedback procedure may be performed. However, when all the terminals in the group normally receive data and transmit the ACK signal to the groupcast transmitting terminal 810, it may not actually be necessary to transmit the ACK signal. Therefore, in another exemplary embodiment according to the present invention, only the common NACK resource 822 may be allocated without the common ACK resources 821 in groupcast data transmission and reception. The groupcast transmitting terminal (i.e., the receiving side of the ACK/NACK signal) may transmit the groupcast data and only monitor the NACK resource 822 at the time when the ACK/NACK feedback is transmitted. When no ACK/NACK feedback is transmitted, the transmitting terminal may determine it as ACK. Also, only when a NACK is detected, the transmitting terminal may determine that groupcast data transmission has failed, and perform retransmission. Here, the groupcast transmitting terminal 810 may signal to the receiving terminals whether normal transmission or retransmission of previous data is performed using a retransmission indicator in a channel (e.g., PDCCH or PSCCH) including control information for the retransmission. In this case, the ACK/NACK feedback procedure may be performed more advantageously in terms of ACK/NACK resource efficiency and complexity, compared to the scheme of separately allocating the common ACK resource and the common NACK resource and monitoring each of them.

Figure 9:
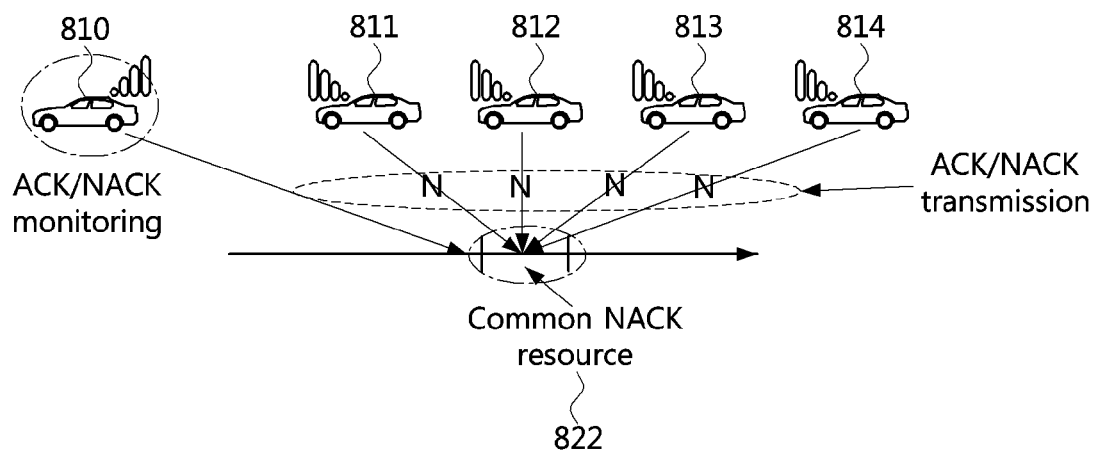
FIG. 9 is a conceptual diagram illustrating a case in which only a common NACK resource is allocated to terminals in a group according to an exemplary embodiment of the present invention.

FIG. 9 is a conceptual diagram illustrating a case in which only a common NACK resource is allocated to terminals in a group according to an exemplary embodiment of the present invention.

Referring to FIG. 9, the groupcast transmitting terminal 810 or the base station may allocate only the common NACK resource 822 without the common ACK resource for the group composed of the terminals 811 to 814. In this case, terminals that normally receive data transmitted by the groupcast transmitting terminal 810 do not need to transmit ACK signals, and only terminals that do not normally receive data may transmit NACK signals through the common NACK resource 822. The groupcast transmitting terminal 810 may monitor only the common NACK resource 822 and retransmit the groupcast data when the NACK signal is detected in the common NACK resource. Here, the groupcast transmitting terminal 810 may signal to the receiving terminals whether normal transmission or retransmission of previous data is performed using a retransmission indicator in a channel (e.g., PDCCH or PSCCH) including control information for the retransmission.

Hereinafter, the feedback scheme described in FIG. 9 may be referred to as a 'common NACK feedback scheme'.

Meanwhile, the groupcast feedback scheme may be configured differently according to a distance between the transmitting terminal and a data receiving terminal. For example, data receiving terminals close to the groupcast transmitting terminal may have a relatively good channel state compared to data receiving terminals far from the data transmitting terminal. Therefore, data receiving terminals close to the groupcast transmitting terminal may have a relatively high probability of successful data reception. In this case, the feedback procedure may be performed more efficiently by applying different feedback schemes according to the distance between the groupcast transmitting terminal and each receiving terminal.

Figure 10:
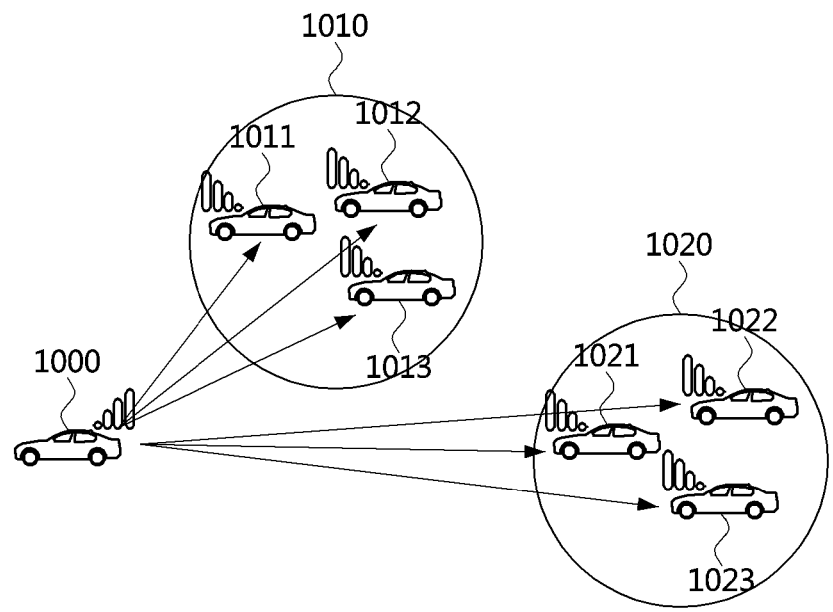
FIG. 10 is a conceptual diagram illustrating a case in which terminals in a group are classified into a plurality of subgroups and different feedback schemes are applied to the subgroups according to an exemplary embodiment of the present invention.

FIG. 10 is a conceptual diagram illustrating a case in which terminals in a group are classified into a plurality of subgroups and different feedback schemes are applied to the subgroups according to an exemplary embodiment of the present invention.

Referring to FIG. 10, in consideration of the distance between each receiving terminal and a groupcast transmitting terminal 1000, receiving terminals 1011, 1012, and 1013 that are close to the groupcast transmitting terminal 1000 are classified into a first subgroup 1010. The receiving terminals far from the groupcast transmitting terminal 1000 (i.e., the remaining terminals 1021, 1022, and 1023) may be classified into a second subgroup 1020. In case of the first subgroup, a terminal that fails to receive data may transmit a NACK through a common feedback resource (i.e., applying the exemplary embodiment of FIG. 9 (common NACK feedback scheme)) On the other hand, in case of the second subgroup, separate ACK/NACK resources may be allocated to the respective receiving terminals, and ACK or NACK may be fed back from the respective receiving terminals according to whether data reception is successful (i.e., applying the exemplary embodiment of FIG. 7 (individual ACK/NACK feedback scheme)). Through such the schemes, a near-far problem in which a feedback signal of a receiving terminal located at a relatively long distance is affected by a feedback signal of a receiving terminal located at a relatively short distance, occurring according to a distance difference between receiving terminals in the common NACK feedback scheme, may be resolved. Also, the problem of discontinuous transmission (DTX) that may occur in the receiving terminals located at a relatively long distance (i.e., terminals belonging to the second subgroup) may be resolved.

Meanwhile, in FIG. 10, the common NACK feedback scheme is applied to the first subgroup (the subgroup of the receiving terminals 1011, 1012, and 1013 that are close to the transmitting terminal 1000), and the individual ACK/NACK feedback scheme is applied to the second subgroup (the subgroup of the receiving terminals 1021, 1022, and 1023 that are far from the transmitting terminal 1000). However, it is also possible to configure the terminals belonging to the second subgroup not to perform feedback.

In the above-described exemplary embodiment, a case in which the receiving terminals are classified into two subgroups has been described. However, in an exemplary embodiment of the present invention, the receiving terminals may be classified into three or more subgroups according to data transmission/reception distances. In this case, a role of classifying the receiving terminals into subgroups may be performed by the groupcast transmitting terminal or the base station to provide the receiving terminals with information on the subgroup to which each terminal belongs. Alternatively, each receiving terminal may directly determine the subgroup to which it belongs.

In addition, in this case, which feedback scheme is applied to each of the subgroups may be determined by a specification. Alternatively, a groupcast transmitting terminal or a base station may configure a feedback scheme applied to each of the subgroups, and provide information on the configured feedback scheme to the receiving terminals. Alternatively, each receiving terminal may directly determine a feedback scheme to be applied to a subgroup to which it belongs according to a predetermined rule.

For example, when classified into three subgroups according to the distance from the groupcast transmitting terminal, the common NACK feedback scheme (i.e., the exemplary embodiment of FIG. 9) may be applied to the first subgroup and the second subgroup, and the individual ACK/NACK feedback scheme (i.e., the exemplary embodiment of FIG. 7) may be applied to the third group. Alternatively, the receiving terminals belonging to the third subgroup may be configured not to perform feedback.

In this case, it may be preferable that the individual ACK/NACK feedback scheme is not applied to any subgroup among several subgroups or only to one subgroup at most. In addition, it is preferable to configure different common NACK feedback resources between the subgroups to which the common NACK feedback scheme is applied.

In the above exemplary embodiment, the case where the data transmission/reception distance between the transmitting terminal 1000 and each terminal is used as a criterion for classifying subgroups is described, but other parameters may be applied. Various parameters may be applied depending on the situation of the system. For example, a received signal strength at each receiving terminal from the groupcast transmitting terminal may be used. In this case, the individual ACK/NACK feedback scheme may be assigned to a subgroup consisting of terminals having a relatively small received signal strength from the transmitting terminal, and the common NACK feedback scheme may be assigned to a subgroup consisting of terminals having a relatively large received signal strength from the transmitting terminal.

In addition, in the above exemplary embodiment, the common NACK feedback scheme is applied to the subgroup(s) close to the groupcast transmitting terminal, and the individual ACK/NACK feedback scheme is applied to the subgroup(s) far from the groupcast transmitting terminal.

However, the individual ACK/NACK feedback scheme may be applied to the subgroup(s) close to the groupcast transmitting terminal, and the common NACK feedback scheme may be applied to the subgroup(s) far from the groupcast transmitting terminal.

Groupcast DTX Feedback Method

In groupcast, when the common ACK resource and the common NACK resource are allocated or only the common NACK resource is allocated, if some terminals in the group do not receive a control channel (PDCCH or PSCCH) carrying scheduling information for groupcast data, the corresponding terminals do not even know whether the groupcast data is transmitted or not. Therefore, in this case, although the corresponding terminals did not receive the data properly, the groupcast transmitting terminal cannot receive the feedback information for this normally. For example, in the common NACK feedback scheme (i.e., the exemplary embodiment of FIG. 9), if some terminals in a group do not transmit NACK by correctly receiving groupcast data and other terminals do not transmit NACK by failing to receive scheduling information for the groupcast data, the groupcast transmitting terminal may erroneously determine that all terminals in the group have normally received the data.

As described above, the state in which even scheduling information of data is not received is called a discontinuous transmission (DTX), and when only the common ACK/NACK resource or the common NACK resource is allocated and operated, the case where such the DTX occurs may not be properly processed. On the other hand, in the individual ACK/NACK feedback scheme of allocating separate ACK and NACK resources to all the terminals in the group, the groupcast transmitting terminal individually monitors the ACK/NACK resources of the respective terminals in the group and determines a terminal that does not transmit either ACK feedback or NACK feedback as a terminal in the DTX state. Therefore, exemplary embodiments of the present invention propose a method for solving the above-described DTX problem in the feedback scheme in which a common ACK resource and a common NACK resource are allocated or only a common NACK resource is allocated for a group.

1) When groupcast transmission and reception time point is preconfigured

A time point of groupcast transmission and reception may be preconfigured with a periodicity, an offset, a time window, etc. between the groupcast transmitting terminal and the receiving terminals.

In an exemplary embodiment according to the present invention, the receiving terminal may monitor a control channel (PDCCH or PSCCH) transmitted by the groupcast transmitting terminal at every specific time point according to a specific periodicity and an offset within a preconfigured duration. When the control channel is detected, the receiving terminal may receive groupcast data according to scheduling information in the control channel, and transmit an ACK/NACK signal or a NACK signal according to whether the reception is successful.

On the other hand, when the receiving terminal does not detect the control channel (PDCCH or PSCCH) transmitted by the groupcast transmitting terminal at the specific time point, the receiving terminal may regard its state as a DTX state, and feed back a DTX or NACK to the groupcast transmitting terminal. This can solve the DTX problem. Since the groupcast transmitting terminal needs to retransmit the groupcast data in both cases of DTX and NACK feedback, it may be more preferable in terms of resource efficiency to operate with the same resource without separately configuring DTX and NACK feedback resources. Whether to transmit the DTX feedback (or, NACK feedback indicating the DTX) may be determined according to whether decoding of the control channel is successful, and whether to transmit the NACK feedback may be determined according to whether decoding of a data channel according to the control channel is successful.

In another exemplary embodiment according to the present invention, the groupcast transmitting terminal may transmit the control channel (PDCCH or PSCCH) regardless of whether or not actual data to be transmitted exists. In this case, when there is no data to be actually transmitted, the groupcast transmitting terminal may transmit dummy control information. In order to prevent a terminal receiving the dummy control information from performing unnecessary data channel decoding, the dummy control information may include information indicating that the transmitted control information is dummy control information. For example, if an independent 1-bit indicator is included in the control information, or if a part of payload of the control information is in a particular status (e.g., resource allocation information is all marked as '0'), the control information may be indicated as the dummy control information. When the received control information is determined to be dummy control information, the receiving terminal may skip decoding on a data channel and perform an ACK/NACK feedback procedure according to the result of decoding the control channel. In this case, since the groupcast transmitting terminal always transmits a control channel according to the preconfigured periodicity and time point, the receiving terminal may clearly distinguish whether a DTX occurs or not, and perform a feedback operation accordingly. On the other hand, when a control channel including control information scheduling actual data instead of the dummy control information is received, the receiving terminal may perform decoding of the scheduled data channel according to the control information and then perform an ACK/NACK feedback procedure accordingly. In this case, the ACK/NACK feedback procedure may be performed through the above-described scheme.

2) When groupcast transmission and reception time point is not preconfigured

When a time point of groupcast transmission and reception time point is not preconfigured between the groupcast transmitting terminal and the receiving terminals, it may be difficult for the receiving terminals to predict when the groupcast data transmission will occur. Therefore, in an exemplary embodiment according to the present invention, after a connection for groupcast transmission and reception is established between the groupcast transmitting terminal and the receiving terminals, the receiving terminal may monitor a control channel (PDCCH or PSCCH) for groupcast data every time. When a control channel is not detected, the receiving terminal may feed back a DTX. Since the groupcast transmitting terminal has knowledge on whether a control channel has been actually transmitted, the groupcast transmitting terminal may determine whether the DTX feedbacks from the receiving terminals are valid. If a DTX feedback is received when the control channel is not actually transmitted, the groupcast transmitting terminal may ignore the DTX feedback. On the other hand, if a DTX feedback is received when the control channel is actually transmitted, the groupcast transmitting terminal may determine that the receiving terminal has failed to receive the control channel and may retransmit the control channel and data. In this case, a resource for the DTX feedback may be separately configured, or a NACK feedback may be used as the DTX feedback. In the case of using a NACK feedback as the DTX feedback, if a NACK feedback is received when the control channel is not actually transmitted, the transmitting terminal may ignore the NACK feedback. On the other hand, if a NACK feedback is received when the control channel is actually transmitted, the receiving terminal may determine that the receiving terminal has failed to receive the control channel and may retransmit the control channel and data. Whether to transmit the DTX feedback (or, NACK feedback indicating the DTX) may be determined according to whether decoding of the control channel is successful, and whether to transmit the NACK feedback may be determined according to whether decoding of a data channel according to the control channel is successful.

In addition, even when the time point of groupcast transmission and reception is not preconfigured, the above-described scheme, in which the transmitting terminal transmits dummy control information when the time point of groupcast transmission and reception is preconfigured, may be applied after a connection for groupcast transmission and reception is established between the groupcast transmitting terminal and the receiving terminals.

Meanwhile, when using the above-described scheme of always transmitting a control channel (PDCCH or PSCCH) at a preconfigured time point regardless of whether or not actual data transmission exists, the receiving terminals may make an accurate determination on the DTX, and may continuously monitor statuses of links for the groupcast communication through the periodic (or continuous) control channel monitoring and feedback, thereby enabling more efficient groupcast data transmission and reception.

Continuously performing feedback as described above may have the advantage of performing continuous monitoring on statuses of links for the communication, but may cause unnecessary waste of feedback resources. Therefore, in an exemplary embodiment according to the present invention, the receiving terminal may transmit a DTX feedback through a pre-allocated resource only when a control channel for the groupcast has not been received for a predetermined time. In case of the ACK/NACK (or NACK) feedback, a feedback may be performed immediately according to whether decoding of data is successful. However, in case of the DTX feedback, the receiving terminal may perform the DTX feedback through a resource preallocated in the groupcast communication establishment procedure only when the receiving terminal fails to receive a control channel for a predetermined time or a time indicated through a separate signaling when the connection for groupcast communication is established, thereby reducing unnecessary feedback operations.

When the individual feedback resources are allocated to the respective terminals in the group, the groupcast transmitting terminal may determine a DTX state of each terminal that does not perform ACK/NACK feedback by monitoring the feedback resources of the respective terminals. However, in case that time points for the ACK/NACK feedback are limited and thus feedbacks on multiple data receptions are transmitted at once, a downlink assignment index (DAI) may be used. In this case, by selecting a feedback resource according to the number of DAIs, a situation in which some terminals do not receive a control channel and thus a DTX occurs may also be recognized in addition to determination of successful transmission of data.

Groupcast Feedback Resource Allocation Method

The ACK/NACK may be transmitted on a PUCCH (or PSCCH). In a situation where multiple unicast transmissions and groupcast transmissions coexist, different ACK/NACK resources should be allocated to be distinguished from ACK/NACK feedbacks of unicast and other groupcasts. In this case, the groupcast transmitting terminal or the base station may explicitly configure allocation of a resource through which the ACK/NACK is transmitted through a specific signaling. Alternatively, the resource through which the ACK/NACK is transmitted may be determined by an index (first index, last index, or specific index) of CCEs of a PDCCH (or PSCCH) including scheduling information of groupcast data, an RB index (first index, last index, or specific index) of a PDSCH (or PSSCH) in which groupcast data is actually transmitted, or an index (first index, last index, or specific index) of a subchannel that is a basic unit of sidelink data transmission and reception. Alternatively, the resource through which the ACK/NACK is transmitted may be determined according to a groupcast (group) ID when the group ID is allocated to each groupcast group. Also, the ACK/NACK resources may be determined by a combination of the above-described schemes.

In more detail, the resources for groupcast common ACK/NACK, NACK, or DTX feedback (hereinafter, 'feedback resources') may be explicitly configured by the groupcast transmitting terminal to the respective terminals in the group through a separate signaling or control information scheduling groupcast data in the procedure of establishing the connection between the groupcast transmitting terminal and the receiving terminal. The terminals belonging to the group may perform groupcast feedback operations by using the resource(s) explicitly configured through the signaling.

Alternatively, the feedback operations may be performed using the groupcast feedback resources implicitly determined by the terminals in the group. As a scheme of implicitly determining the groupcast feedback resource, there may exist a scheme of determining the feedback resource by using a first or specific index of control channel elements (CCEs) constituting a control channel (PDCCH or PSCCH), a scheme of determining the feedback resource by using an index of a first or specific resource block (RB) of a data channel (PDSCH or PSSCH) used for transmitting groupcast data, or a scheme of determining the feedback resource by using a groupcast (group) ID assigned when the group ID is assigned to each groupcast group. Also, the feedback resource may be determined by a combination of the above-described schemes. The resource index of the control channel or data channel may be replaced with an index of a subchannel that is a basic unit of sidelink data transmission and reception.

Figure 11:
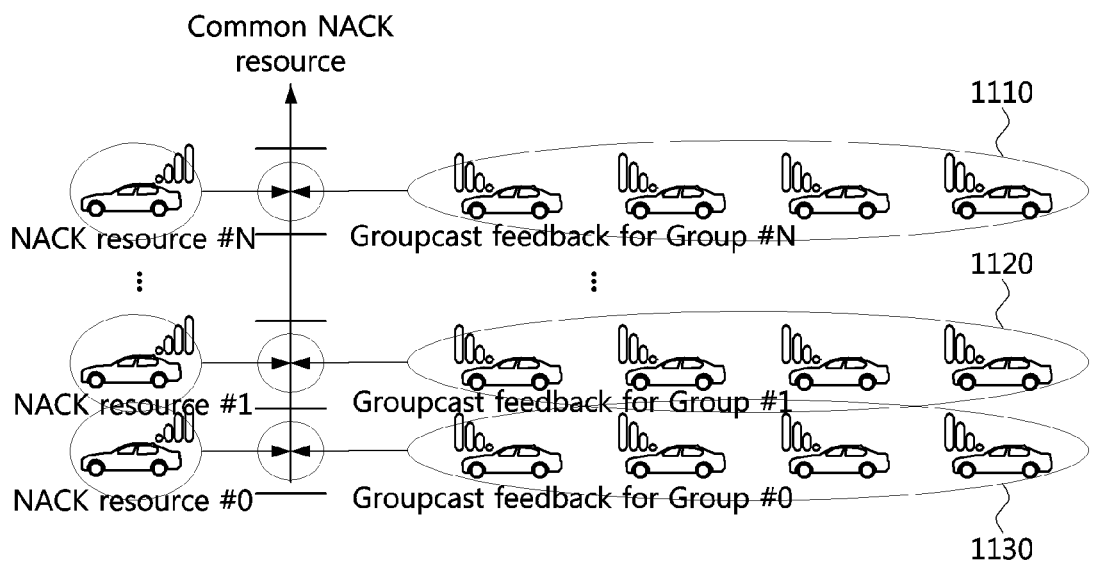
FIG. 11 is a conceptual diagram illustrating a case of configuring a common feedback resource using a groupcast ID according to an exemplary embodiment of the present invention.

FIG. 11 is a conceptual diagram illustrating a case of configuring a common feedback resource using a groupcast ID according to an exemplary embodiment of the present invention.

Referring to FIG. 11, a feedback resource of a group 1110, 1120, or 1130 may be implicitly configured according to a groupcast ID assigned to each group. For example, a group (group #0) having a group ID of '0' may perform a feedback operation through a '0'-th feedback resource (NACK resource #0), a group (group #1) having a group ID of '1' may perform a feedback operation through an '1'-th feedback resource (NACK resource #1), and a group (group #N) having a group ID of 'N' may perform a feedback operation through an 'N'-th feedback resource (NACK resource #N). When configuring the feedback resource, a method of implicitly configuring the feedback resource by assigning a group ID to a specific formula may be also applicable.

The groupcast (or, unicast) feedback signal may be transmitted through a specific channel (e.g., physical sidelink feedback channel (PSFCH)), and a plurality of groupcast and unicast feedback signals may be multiplexed in the channel for transmitting the feedback signal. The receiving terminal may select an index of a resource used for feedback transmission in the feedback channel by using a resource index (i.e., subchannel index) of a control channel used for scheduling data transmission, a resource index (i.e., subchannel index) of a data channel, a group ID, or a combination thereof, and transmit a feedback signal through the corresponding resource. Similarly, the groupcast terminal may identify the index of the resource used for feedback transmission by using the resource index (e.g., subchannel index) of the control channel used for scheduling data transmission, the resource index (e.g., subchannel index) of the data channel, the group ID, or the combination thereof, and may monitor a feedback signal in the corresponding resource. The feedback channel (PSFCH) may be configured for each slot and may be configured with a specific periodicity.

Meanwhile, when the feedback channel is configured with a specific periodicity, in configuring a feedback resource in the feedback channel, a method of configuring the feedback resource in the feedback channel based on a position of a slot in which corresponding data is transmitted within a specific period may be considered in addition to the resource index (i.e., subchannel index) of the control channel used for groupcast data transmission within the specific period, the resource index (i.e., subchannel index) of the data channel, the group ID, or a combination thereof.

More specifically, when the feedback channel is configured to have a periodicity of 'P' slots, the feedback channel may be transmitted every 'P' slot. Feedback transmissions for data transmitted through previous 'T' slots may be multiplexed and transmitted in the feedback channel transmitted every 'P' slot. In this case, when configuring the feedback resource in the feedback channel, 0, . . . , and T−1 which are relative slot indexes for the 'T' slots may be additionally applied to the feedback resource configuration. A modulo operation of the slot index may be applied. In this case, the 'T' slots may be the previous 'T' slots including the slot through which the feedback channel is transmitted, or may be the previous 'T' slots except the slot through which the feedback channel is transmitted. Alternatively, in consideration of a processing time from reception of the data channel to generation of the HARQ feedback signal, the 'T' slots may be T slots from a slot before a predetermined time (e.g., K slots) from the slot through which the feedback channel is transmitted. Here, the values of 'T' and 'P' may be equal or different. Also, the above-described feedback resource configuration method may be applicable to unicast data transmission as well as the feedback resource configuration in groupcast communication.

The various feedback schemes described above may be applied for the groupcast feedback. More specifically, as the groupcast feedback scheme, the scheme in which terminals in a group transmit only NACK signals through a common feedback resource (i.e., common NACK feedback scheme' and the scheme in which terminals in a group transmit ACK or NACK signals through respective feedback resources (i.e., 'individual ACK/NACK feedback scheme') may be applied and which scheme is to be applied may be configured according to the system situation. Also, a resource region for groupcast communication may coexist with a resource region for unicast communication. Therefore, the groupcast feedback scheme may also be operated in coexistence with the unicast feedback scheme. In the case where resources for groupcast and unicast communications coexist and the common NACK feedback scheme is applied as the groupcast feedback scheme, since the groupcast requires only one feedback resource between a transmitting side and a receiving side (multiple terminals in case of the groupcast) identically to the unicast, if the feedback resource is configured implicitly based on a specific index or ID of a resource (e.g., subchannel) used for communication, coexistence with feedback resources for unicast may be possible. In the case where a common resource region for transmitting feedback information is configured and individual feedback resources are implicitly configured in the common resource region based on specific information used for communication, since even the groupcast between a transmitting side and a receiving side comprising a plurality of terminal requires only one resource for each group as a resource for transmitting feedback information unlike the unicast, this case may be identical to the unicast which comprises one transmitting side and one receiving side and requires only one resource for transmitting feedback information. Therefore, in this case, it may be preferable that the unicast and the groupcast to which the common NACK feedback scheme is applied share the same feedback resource region. However, when the individual ACK/NACK feedback scheme is used, each of a plurality of terminals in the group performing groupcast communication transmits individual feedback information. Since the plurality of terminals in the group perform data transmission and reception based on the same information and resources, when implicitly configuring the feedback resources based on specific information as described above, it may be difficult to allocate individual feedback resources to the plurality of terminals in the group. Also, when the same feedback resource region is shared with the unicast feedback scheme, collision with the unicast feedback resource may occur. Therefore, in this case, it may be preferable to configure a separate feedback resource region from the unicast or the groupcast to which the common NACK feedback scheme is applied. Therefore, in an exemplary embodiment of the present invention, according to the groupcast feedback scheme, the unicast feedback resource region and the groupcast feedback resource region may coexist, or the groupcast feedback resource region may be configured independently of the unicast feedback resource region. More specifically, in case of the groupcast communication to which the common NACK feedback scheme is applied, the unicast feedback resource region and the groupcast feedback resource region may be configured to be shared. In case of the groupcast to which the individual ACK/NACK feedback scheme is applied, a feedback resource region separate from that of the unicast or the groupcast to which the common NACK feedback scheme is applied may be configured. Alternatively, the feedback resource region may be configured as one regardless of the unicast and groupcast feedback scheme, but the feedback resource region may be divided into sub resource regions. For example, in case of the groupcast to which the individual ACK/NACK feedback scheme is applied, the separate sub resource regions may be configured in the common feedback resource region.

When the individual ACK/NACK feedback scheme is used, a method of configuring resources for transmitting feedback information to each of a plurality of terminals in a group is needed. For example, when resources are implicitly allocated based on resource information such as a subchannel index or specific information such as a group ID or a transmitting terminal ID (i.e., source ID), since the plurality of terminals in the group all have the same specific information, individual feedback resources for each of the plurality of terminals in the group cannot be configured. Therefore, in an exemplary embodiment according to the present invention, when using the individual ACK/NACK feedback scheme, different feedback resources may be configured by applying information on each of the terminals in the group in addition to the specific information representing the group. More specifically, as a method of allocating different feedback resources to a plurality of terminals in a group, specific information representing a group, that is, resource information such as a subchannel index or specific information such as a group ID or a transmitting side ID may indicate a separate feedback resource region for the individual ACK/NACK feedback scheme. Also, an individual feedback resource in the separate feedback resource region may be configured based on specific information of each of the plurality of terminals in the group. In this case, the specific information of each of the plurality of terminals in the group may be individually signaled to the receiving terminal during the connection establishment process between the transmitting terminal and the receiving terminal for the groupcast communication. In this case, the specific information of each of the plurality of terminals may be a different offset value that distinguishes the corresponding terminal in the feedback resource region. Alternatively, the specific information of each of the plurality of terminals may be configured using a unique identifier (e.g., terminal ID) of each receiving terminal or a result value obtained by substituting the unique identifier into a specific function for randomization (e.g., hash function). This method can reduce the resources and complexity required for signaling compared to the method through the individual signaling of the offset values, but collision of some feedback resources may occur between the plurality of terminals in the group.

Groupcast Feedback Transmission Method

When a common feedback resource is allocated to a group for groupcast and all terminals in the group transmit ACK/NACK or NACK, the groupcast transmitting terminal may receive the feedback signals transmitted from a plurality of terminals in a combined form. In this case, since channel states of the respective terminals are different, even when a plurality of terminals transmit the same feedback signals, the magnitudes and phases of the feedback signals may change in the course of passing through different channels so that the combined feedback signal actually received at the groupcast transmitting terminal may be mutually either a constructive sum or a destructive sum. For example, when the feedback signal from the terminal A is −s and the feedback signal from the terminal B is −s, the combined feedback signal may become −2s to increase the detection probability of the feedback signal. On the other hand, when the feedback signal from the terminal A is −s and the feedback signal from the terminal B is +s, the combined feedback signal may become 0 (=−s+s), which makes it difficult to detect the correct feedback signal.

Therefore, an exemplary embodiment according to the present invention proposes a feedback signal transmission scheme for preventing such the destructive sum when using a common feedback resource in a group. When a time division duplexing (TDD) is used as a transmission scheme for links between terminals in a groupcast group, a terminal transmitting a feedback signal may transmit the feedback signal by using a complex conjugate value of a channel estimated when the terminal receives a control channel or a data channel or a complex conjugate value of a phase of the estimated channel. Assuming that a reception channel of a terminal i receiving data in the groupcast communication is $h_i$, the terminal i may obtain information on the reception channel through channel estimation. If a change in channel state from when a terminal receives data to when the terminal transmits feedback information on the data is not large, the feedback information may be transmitted using the acquired channel information, so that a destructive sum of feedback information transmitted from multiple terminals in the group can be avoided. This may be represented by Equation 1 and Equation 2 below. Equation 1 represents a feedback signal at the groupcast transmitting terminal when the feedback signal is transmitted using a complex conjugate of the estimated channel. Equation 2 represents a feedback signal at the groupcast transmitting terminal when the feedback signal is transmitted using a complex conjugate of the phase of the estimated channel. In Equations 1 and 2, $x_i$ is feedback information of the terminal i.

$$y = \sum_{i=0}^{N-1} h_i x_i = \sum_{i=0}^{N-1} h_i h_i s = \sum_{i=0}^{N-1} h_i^1 s \qquad \text{[Equation 1]}$$

$$y = \sum_{i=0}^{N-1} h_i x_i = \sum_{i=0}^{N-1} h_i e^{-j\theta_1} s = \sum_{i=0}^{N-1} h_i e^{j\theta_1} e^{-j\theta_1} s = \sum_{i=0}^{N-1} h_i s \qquad \text{[Equation 2]}$$

In this case, since signals of a common ACK/NACK or a common NACK, which are feedback information between groupcast terminals, are the same between the groupcast terminals, the feedback information $x_i$ of each terminal may be represented by the same value s.

Groupcast Power Control Method

In case of groupcast, unlike unicast, since the groupcast is performed between one transmitting terminal and a plurality of receiving terminals, a general power control scheme of the unicast may not be applied as it is. Therefore, exemplary embodiments according to the present invention propose a power control method for groupcast data transmission and reception.

In an initial setup phase for groupcast, the groupcast transmitting terminal should set an appropriate power for transmitting data to the receiving terminals. In an exemplary embodiment according to the present invention, as a method for setting an appropriate power for the receiving terminals, the groupcast transmitting terminal may set an initial transmission power based on information fed back from the receiving terminals. In the initial setup phase for groupcast, the receiving terminals may measure reception power related parameters such as a reference signal received power (RSRP) or path loss based on a reference signal (e.g., a synchronization signal block (SSB)) transmitted by the groupcast transmitting terminal or the base station. The receiving terminals may feed back the measured reception power related parameters to the groupcast transmitting terminal, and the groupcast transmitting terminal may set the initial transmission power in consideration of the reception power related parameters. More specifically, the groupcast transmitting terminal may set the initial transmission power in consideration of the minimum value among the reception power related parameters. Since the groupcast is performed within a specific range in which communication between terminals belonging to a group can be made, when the initial transmission power is set in consideration of the minimum value of the reception power related parameters, stable data transmission can be performed for all receiving terminals within a specific range. In this case, when the initial transmission power considering the minimum value exceeds the maximum transmission power of the groupcast transmitting terminal, the maximum transmission power of the groupcast transmitting terminal may be used as the initial transmission power. Alternatively, when stable data transmission is not necessarily required for all the receiving terminals within a specific range, the initial transmission power may be set in consideration of the N-th minimum value rather than the minimum value among the reception power related parameters received from the receiving terminals. Here, N may be set according to the type of groupcast. For example, in the case of data requiring stable reception for all the receiving terminals in the specific range, N may be set to 1. On the other hand, if there is no problem even if some receiving terminals do not receive data, N may be set to a value greater than 1. By adjusting N in this way, it may be possible to prevent the initial transmission power from being set unnecessarily high, and the power usage efficiency can be improved. The value of N may be set differently according to the service type of groupcast. For example, a low N value may be set for safety-related data that should be received by all terminals belonging to a group, and a high N value may be set for infotainment data of low importance.

Figure 12:
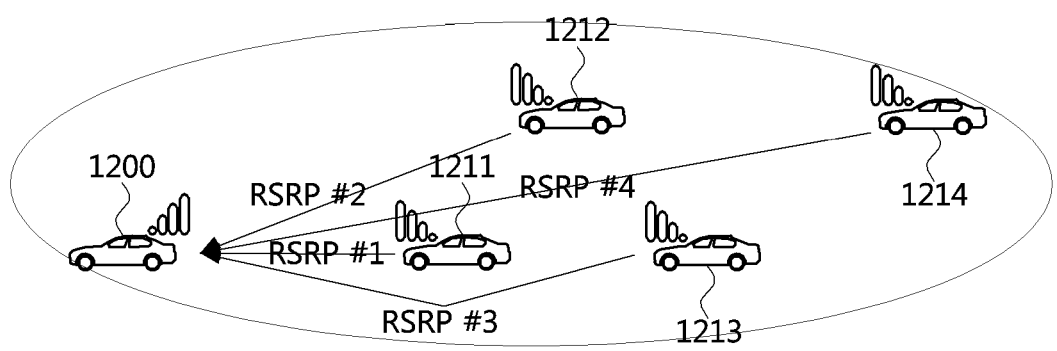
FIG. 12 is a conceptual diagram illustrating a case in which RSRP values are fed back from all receiving terminals within a groupcast communication range according to an exemplary embodiment of the present invention.

FIG. 12 is a conceptual diagram illustrating a case in which RSRP values are fed back from all receiving terminals within a groupcast communication range according to an exemplary embodiment of the present invention.

Referring to FIG. 12, each of receiving terminals 1211 to 1214 in a group may measure each RSRP and feed back to a groupcast transmitting terminal 1200. For example, the RSRP between the transmitting terminal 1200 and the terminal 1211 may be measured as RSRP #1, the RSRP between the transmitting terminal 1200 and the terminal 1212 may be measured as RSRP #2, the RSRP between the transmitting terminal 1200 and the terminal 1213 may be measured as RSRP #3, and the RSRP between the transmitting terminal 1200 and the terminal 1214 may be measured as RSRP #4.

Assuming that RSRP values are measured as RSRP #1>RSRP #2>RSRP #3>RSRP #4 according to the distances between the groupcast transmitting terminal 1200 and the receiving terminals 1211 to 1214, when it is necessary to enable stable data transmission to all the receiving terminals within a groupcast communication range, an initial transmission power may be set considering RSRP #4 which is the minimum value. However, when data does not necessarily need to be transmitted to all receiving terminals within the groupcast communication range, the initial transmission power may be set in consideration of an RSRP selected among RSRP #1, RSRP #2, and RSRP #3. In this case, the reception power related parameters measured at the receiving terminals may be other parameters besides the above-mentioned RSRP or path-loss.

Meanwhile, groupcast in V2X may be performed through uplink resources of a general NR system. Therefore, in an exemplary embodiment according to the present invention, for power control between the groupcast transmitting terminal and the receiving terminals, power related parameters assuming communication between the transmitting terminal and the base station may be considered. When the groupcast between the groupcast transmitting terminal and the receiving terminals is performed through uplink resources, interference may occur in uplink communication between the base station and other terminals of the base station, which do not belong to the group. Therefore, a power related parameter A set for the groupcast may be compared with a power related parameter B required when a communication between the transmitting terminal in the group and the base station is assumed. When A is less than B, A may be used as it is. On the other hand, when A is greater than B, the transmission power for groupcast may be limited to B.

Whether the data transmitted from the transmitting terminal is normally received by the receiving terminals in the groupcast may be determined through HARQ ACK/NACK feedback. In this case, when receiving a NACK feedback from the receiving terminals, the transmitting terminal may transmit additional information or retransmits the same data according to a HARQ scheme through retransmission to increase the probability of receiving data at the receiving terminals. In an exemplary embodiment according to the present invention, the groupcast transmitting terminal may perform the retransmission by increasing the transmission power by a certain amount when the retransmission occurs by receiving a NACK feedback. Here, the amount of increasing the transmission power may be configured through system information or the like, or configured depending on the system situation. When the transmitting terminal continuously receives the NACK feedback from the receiving terminals while transmitting data, the transmitting terminal may continuously increase the transmission power according to the configured amount of increasing. When the increased transmission power exceeds the maximum transmission power of the transmitting terminal, the transmission power may be fixed to the maximum transmission power of the transmitting terminal. Also, in case that the groupcast transmitting terminal is a terminal capable of multi-beamforming, when the NACK feedback is received, beam switching may be used to retransmit the data using a beam other than the beam used for initial data transmission. When the NACK feedback is continuously received from the receiving terminals, the transmitting terminal may continuously transmit the data by using a beam different from the previous transmission beam through beam switching.

Alternatively, a combination of the method of increasing the transmission power for the retransmission and the method of transmitting using another beam through the beam switching may be possible. More specifically, the method of increasing the transmission power and the method using beam switching may be simultaneously applied. For example, when the NACK feedback is received from the receiving terminals, the groupcast transmitting terminal may increase the transmission power and simultaneously switch to another beam to retransmit the data. Alternatively, it is possible to sequentially apply the method of increasing the transmission power and the method using beam switching. For example, when the NACK feedback is received from the receiving terminals, the transmitting terminal may first transmit the data through different beams sequentially through beam switching, and then increase the transmission power thereafter (i.e., after data retransmission through all beams is completed). In the case of applying the two methods sequentially, which method is to be applied first may be arbitrarily determined by the transmitting terminal or may be preconfigured through separate signaling.

In this case, the NACK information received from the receiving terminals may be individual feedbacks received from the respective receiving terminals, or may be a common NACK feedback of the groupcast group. Also, there may be a limit on the number of NACK feedbacks for the data transmission and the number of retransmissions. Also, in the case of not only receiving a NACK feedback but also receiving a DTX feedback, the exemplary embodiments of the present invention may be applied.

Figure 13:
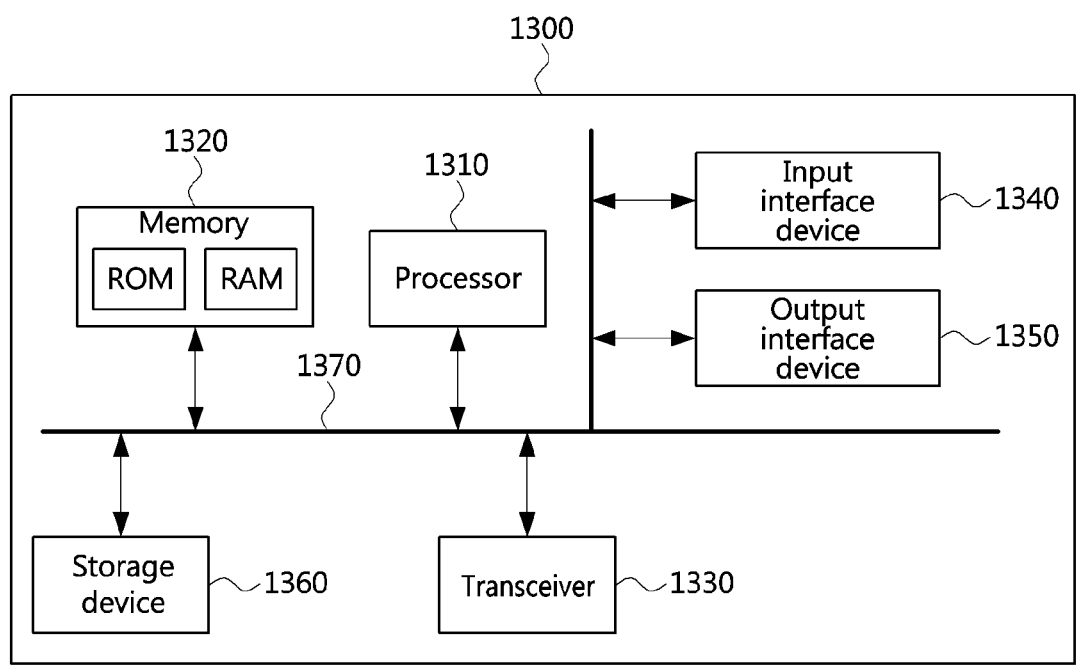
FIG. 13 is a block diagram illustrating a configuration of an apparatus capable of performing a method according to exemplary embodiments of the present invention.

FIG. 13 is a block diagram illustrating a configuration of an apparatus capable of performing a method according to exemplary embodiments of the present invention.

In FIG. 13, a general structure applicable to the above-described transmitting terminal and receiving terminal is described, but the same or similar structure may be applied to the base station.

Referring to FIG. 13, a terminal 1300 may include at least one processor 1310, a memory 1320, and a transceiver 1330 connected to a network to perform communication. In addition, the terminal 1300 may further include an input interface device 1340, an output interface device 1350, a storage device 1360, and the like. The components included in the terminal 1300 may be connected by a bus 1370 to communicate with each other. However, each component included in the terminal 1300 may be connected to the processor 1310 through a separate interface or a separate bus instead of the common bus 1370. For example, the processor 1310 may be connected to at least one of the memory 1320, the transceiver 1330, the input interface device 1340, the output interface device 1350, and the storage device 1360 through a dedicated interface.

The processor 1310 may execute at least one instruction stored in at least one of the memory 1320 and the storage device 1360. The processor 1310 may refer to a central processing unit (CPU), a graphics processing unit (GPU), or a dedicated processor on which the methods according to the exemplary embodiments of the present invention are performed. Each of the memory 1320 and the storage device 1360 may be configured as at least one of a volatile storage medium and a nonvolatile storage medium. For example, the memory 1320 may be configured with at least one of a read only memory (ROM) and a random access memory (RAM).

The at least one instruction may be configured such that the processor 1310 performs each step of the groupcast transmission method or the groupcast reception method according to the exemplary embodiments of the present invention described above. All information exchanged between the terminals or between the base station and the terminal may be transmitted or received through the transceiver 1330 under the control of the processor 1310.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for sidelink groupcast transmission, performed in a transmitting terminal, the method comprising:
configuring a groupcast feedback scheme;
transmitting sidelink control information (SCI) indicating resource allocation information and the groupcast feedback scheme to at least one receiving terminal:
performing groupcast transmission based on the resource allocation information; and
receiving feedback information from one or more of the at least one receiving terminal according to the groupcast feedback scheme,
wherein the groupcast feedback scheme includes a scheme of assigning individual acknowledgement/negative acknowledgement (ACK/NACK) resources to the at least one receiving terminal and a scheme of assigning a common NACK resource to the at least one receiving terminal,
wherein the individual ACK/NACK resources are implicitly determined by each of the at least one receiving terminal using a specific index of a sub channel which is a basic resource unit of the data channel used for the groupcast transmission, a slot index of the data channel used for the groupcast transmission, an identifier of the transmitting terminal, and an identifier of the each of the at least receiving terminal, and
wherein the common NACK resource is implicitly determined by each of the at least one receiving terminal using a specific index of a sub channel which is a basic resource unit of the data channel used for the groupcast transmission, a slot index of the data channel used for the groupcast transmission, and an identifier of the transmitting terminal.

2. The method according to claim 1, wherein the individual ACK/NACK resources or the common NACK resource are explicitly configured by the transmitting terminal to each of the at least one receiving terminal or to all of the at least one terminal through a control channel scheduling the groupcast transmission.

3. A method for sidelink groupcast reception, performed in a first receiving terminal, the method comprising:
receiving sidelink control information (SCI) indicating resource allocation information and a groupcast feedback scheme from a transmitting terminal;
performing groupcast reception based on the resource allocation information; and
transmitting feedback information to the transmitting terminal according to the groupcast feedback scheme,
wherein the groupcast feedback scheme includes a scheme of assigning individual acknowledgement negative acknowledgement (ACK/NACK) resources to at least one receiving terminal including the first receiving terminal and a scheme of assigning a common NACK resource to the at least one receiving terminal including the first receiving terminal,
wherein the individual ACK/NACK resources are implicitly determined by each of the at least one receiving terminal using a specific index of a sub channel which is a basic resource unit of the data channel used for the groupcast reception, a slot index of the data channel used for the groupcast reception, an identifier of the transmitting terminal, and an identifier of the each of the at least receiving terminal, and
wherein the common NACK resource is implicitly determined by each of the at least one receiving terminal using a specific index of a sub channel which is a basic resource unit of the data channel used for the groupcast reception, a slot index of the data channel used for the groupcast reception, and an identifier of the transmitting terminal.

4. The method according to claim 3, wherein the individual ACK/NACK resources or the common NACK resource are explicitly configured by the transmitting terminal to each of the at least one receiving terminal or to all of the at least one terminal through a control channel scheduling the groupcast transmission.

* * * * *